United States Patent
Fukushima et al.

(10) Patent No.: US 9,148,527 B2
(45) Date of Patent: Sep. 29, 2015

(54) FACSIMILE APPARATUS CAPABLE OF OUTPUTTING COMMUNICATION TONES, CONTROL METHOD THEREFOR, AND STORAGE MEDIUM

(71) Applicant: CANON KABUSHIKI KAISHA, Tokyo (JP)

(72) Inventors: Michio Fukushima, Yokohama (JP); Eiji Ohara, Kawasaki (JP); Shigeru Koizumi, Tokyo (JP); Daisuke Suga, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 30 days.

(21) Appl. No.: 13/756,680

(22) Filed: Feb. 1, 2013

(65) Prior Publication Data
US 2013/0215463 A1    Aug. 22, 2013

(30) Foreign Application Priority Data
Feb. 16, 2012  (JP) .................................. 2012-031570

(51) Int. Cl.
*H04M 11/00* (2006.01)
*H04N 1/00* (2006.01)

(52) U.S. Cl.
CPC .......... *H04N 1/001* (2013.01); *H04N 1/00488* (2013.01); *H04N 1/00217* (2013.01); *H04N 2201/0093* (2013.01)

(58) Field of Classification Search
None
See application file for complete search history.

(56) References Cited

U.S. PATENT DOCUMENTS

| | | | |
|---|---|---|---|
| 2003/0095544 A1* | 5/2003 | Chu | 370/352 |
| 2004/0184110 A1* | 9/2004 | Maei et al. | 358/400 |
| 2005/0117183 A1* | 6/2005 | Adlakha et al. | 358/402 |
| 2007/0127083 A1* | 6/2007 | Saito | 358/400 |
| 2012/0057192 A1* | 3/2012 | Chen et al. | 358/1.15 |

FOREIGN PATENT DOCUMENTS

JP   2006-094024 A   4/2006

* cited by examiner

*Primary Examiner* — Maria El-Zoobi
(74) *Attorney, Agent, or Firm* — Rossi, Kimms & McDowell LLP (57) ABSTRACT

A facsimile apparatus which uses a tone output unit that outputs tones when a VoIP communication in which audio data for a facsimile communication by way of a public telephone line is sent and received over an IP network is being carried out, so as to make a user aware that a non-VoIP communication in which a facsimile communication is carried out by way of the IP network without using audio data is being carried out. When the VoIP communication is being carried out, the tone output unit outputs a first tone for notifying the user of a communication status of the VoIP communication. When the non-VoIP communication is carried out, the tone output unit outputs a second tone so as to notify the user of a communication status of the non-VoIP communication.

9 Claims, 9 Drawing Sheets

|  | DATA OUTPUT | |
|---|---|---|
| MODE1 | 1・MODEM DSP UNIT →CODEC UNIT | ON |
|  | 2・MODEM DSP UNIT →CONTROLLER UNIT | ON |
|  | 3・SPEAKER OUTPUT | ON |
| MODE2 | 1・MODEM DSP UNIT →CODEC UNIT | ON |
|  | 2・MODEM DSP UNIT →CONTROLLER UNIT | ON |
|  | 3・SPEAKER OUTPUT | OFF |
| MODE3 | 1・MODEM DSP UNIT →CODEC UNIT | ON |
|  | 2・MODEM DSP UNIT →CONTROLLER UNIT | ON |
|  | 3・SPEAKER OUTPUT | ON |
| ⋮ | | |

FACSIMILE APPARATUS CAPABLE OF OUTPUTTING COMMUNICATION TONES, CONTROL METHOD THEREFOR, AND STORAGE MEDIUM

BACKGROUND OF THE INVENTION

1. Field of the Invention

The present invention relates to a facsimile apparatus, a control method therefor, and a computer-readable storage medium storing a program for implementing the method.

2. Description of the Related Art

Conventionally, facsimile functions of communication apparatuses provided for the public switched telephone network (PSTN) carry out communications using audio data according to ITU-T Recommendation T.30 (hereafter referred to as T.30), and the functions have been realized using modems for analog lines. In general, the communication apparatuses output, as a tone, a signal output from the modems or a signal received from the public switched telephone network so as to notify a user that a facsimile communication is started or underway.

On the other hand, in recent years, there have been developed communication apparatuses which are capable of carrying out facsimile communications over an IP network. The IP network ready communication apparatuses send and receive facsimiles according to ITU-T Recommendation T.38 (hereafter referred to as T.38) when a party at the other end supports T.38.

When the party at the other end does not support T.38, T.30 audio data is sent and received as deemed audio data packets over an IP network (VoIP: Voice over IP), and facsimiles are sent and received over the public switched telephone network by way of a VoIP gateway from the IP network (T.30) (see, for example, Japanese Laid-Open Patent Publication (Kokai) No. 2006-94024).

A facsimile apparatus described in Japanese Laid-Open Patent Publication (Kokai) No. 2006-94024 handles digital image data complying with T.38 when a party at the other end supports sending and receiving over an IP network (T.38).

On the other hand, when the party at the other end supports only sending and receiving over the public switched telephone network (PSTN), communications are carried out using VoIP, and hence at the time of sending, audio data is generated from image data obtained by scanning, and G.711 PCM data is generated from the audio data.

At the time of receipt, audio data is generated from the G.711 PCM data to generate image data for printing.

According to Japanese Laid-Open Patent Publication (Kokai) No. 2006-94024, a G.711 block is used for data conversion, but there has also been developed a technique that a modem which carries out communications using T.30 is equipped with a G.711 data conversion function.

When a communication apparatus supporting both T.38 and T.30 carries out a communication with an apparatus at the other end using T.30 (VoIP), data conversion is performed in the following order: digital image data→audio data→G.711 data, or G.711 data→audio data→digital image data.

On this occasion, extracting analog signals from a modem and outputting them to a speaker enable a user to hear communication tones.

However, when a communication with an apparatus at the other end is carried out using T.38, no audio data is produced because data handled in the communication is digital data, and hence a user hears no communication tones.

In order to enable a user to hear communication tones when a communication with an apparatus at the other end is carried out using T.38, a communication apparatus may be equipped with an additional audio output circuit that outputs voice, but this requires cost for adding the circuit.

Therefore, even when a communication with an apparatus at the other end is carried out using T.38, a mechanism that outputs tones using a modem for use in T.30 communications is required.

Moreover, in communications other than T.38 communications, it is desirable to output tones using a modem when providing notification to a user by tones.

SUMMARY OF THE INVENTION

The present invention provides a facsimile apparatus and a control method therefor which use a tone output unit that outputs tones when a VoIP communication in which audio data for a facsimile communication by way of a public telephone line is sent and received over an IP network is being carried out, so as to make a user aware that a non-VoIP communication in which a facsimile communication is carried out by way of an IP network without using audio data is being carried out, as well as a computer-readable storage medium storing a program for implementing the method.

Accordingly, a first aspect of the present invention provides a facsimile apparatus capable of carrying out a VoIP communication in which audio data for a facsimile communication by way of a public telephone line is sent and received over an IP network and a non-VoIP communication in which a facsimile communication is carried out by way of the IP network without using the audio data, comprising a tone output unit configured to, when the VoIP communication is being carried out, output a first tone for notifying a user of a communication status of the VoIP communication, and a control unit configured to, when the non-VoIP communication is carried out, control the tone output unit to output a second tone so as to notify the user of a communication status of the non-VoIP communication.

Accordingly, a second aspect of the present invention provides a control method for a facsimile apparatus capable of carrying out a VoIP communication in which audio data for a facsimile communication by way of a public telephone line is sent and received over an IP network and a non-VoIP communication in which a facsimile communication is carried out by way of the IP network without using the audio data, comprising a tone output step of, when the VoIP communication is being carried out, causing a tone output unit to output a first tone for notifying a user of a communication status of the VoIP communication, and a control step of, when the non-VoIP communication is carried out, controlling the tone output unit to output a second tone so as to notify the user of a communication status of the non-VoIP communication.

Accordingly, a third aspect of the present invention provides a non-transitory computer-readable storage medium storing a program for causing a computer to implement a control method for a facsimile apparatus capable of carrying out a VoIP communication in which audio data for a facsimile communication via a public telephone line is sent and received over an IP network and a non-VoIP communication in which a facsimile communication is carried out by way of the IP network without using the audio data, the control method comprising a tone output step of, when the VoIP communication is being carried out, causing a tone output unit to output a first tone for notifying a user of a communication status of the VoIP communication, and a control step of, when the non-VoIP communication is carried out, controlling the tone output unit to output a second tone so as to notify the user of a communication status of the non-VoIP communication.

According to the present invention, the tone output unit that outputs tones when a VoIP communication in which audio data for a facsimile communication by way of a public telephone line is sent and received over the IP network is carried out is used to make the user aware that a non-VoIP communication in which a facsimile communication is carried out by way of the IP network without using audio data is being carried out.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof. It should be noted that in the embodiment described below, a facsimile apparatus according to the present invention is applied to an image forming apparatus.

Figure 1:
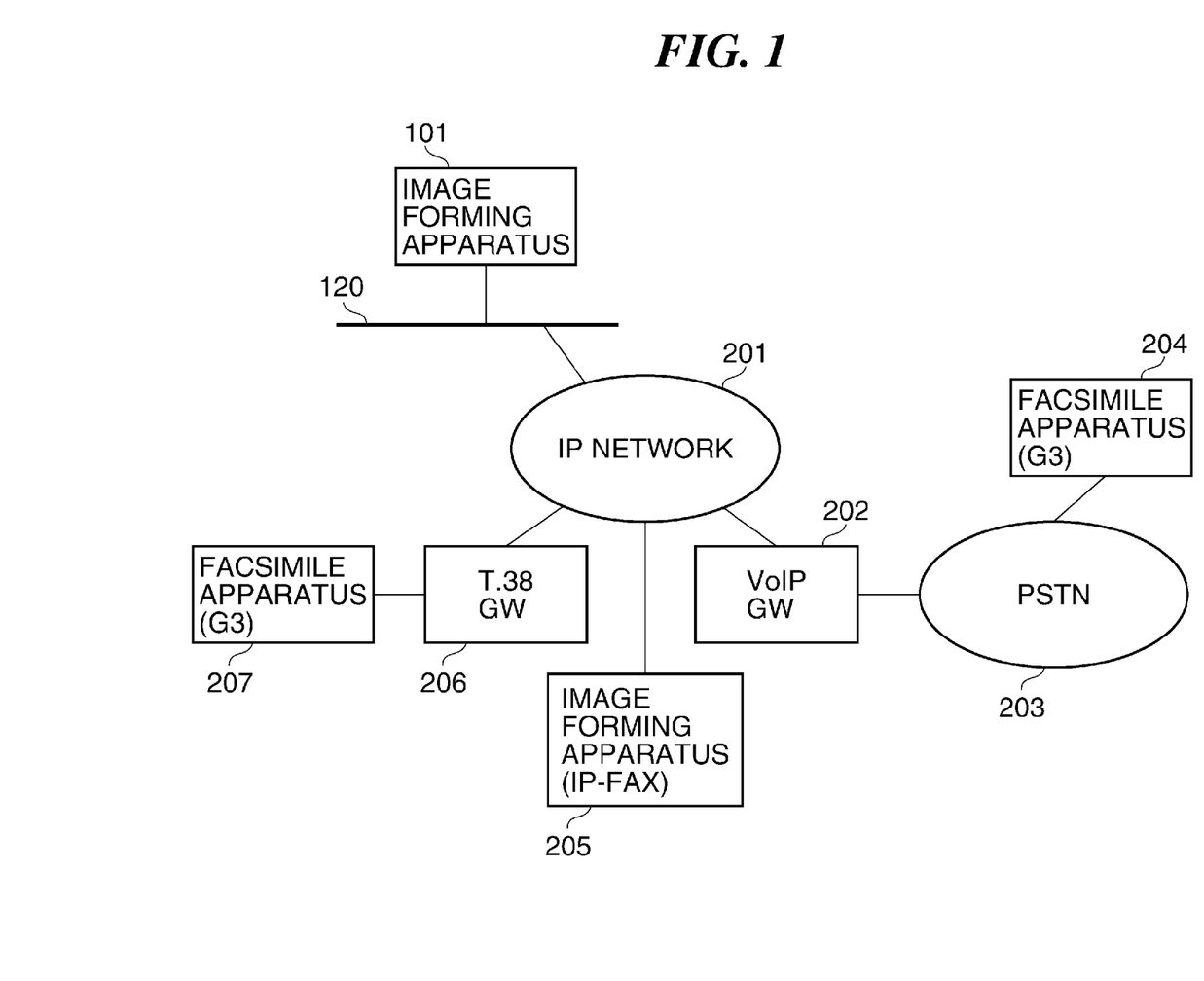
FIG. 1 is a diagram schematically showing a network arrangement including an image forming apparatus supporting IP-FAX according to an embodiment of the present invention.

FIG. 1 is a diagram schematically showing a network arrangement including the image forming apparatus 101 supporting IP-FAX according to the embodiment of the present invention.

Referring to FIG. 1, the image forming apparatus 101 is connected to an IP network 201 via a LAN 120. An image forming apparatus 205 having IP-FAX functions similar to those of the image forming apparatus 101 is connected to the IP network 201.

Also, a VoIP gateway 202 that passes data to and from the IP network 201 and a PSTN 203 that is the existing public switched telephone network is connected to the IP network 201. A facsimile apparatus 204 and a facsimile apparatus 207 support only voice communications complying with ITU-T Recommendation T.30. A T.38 gateway 206 that operates according to ITU-T Recommendation T.38 is connected to the IP network 201. In the following description, ITU-T Recommendation T.30 will be referred to merely as T.30, and ITU-T Recommendation T.38 will be referred to merely as T.38.

In this network arrangement, the image forming apparatus 101 is capable of carrying out facsimile communications according to T.38 and facsimile communications using a deemed audio method (hereafter referred to as "VoIP") with the image forming apparatus through the IP network 201. In the following description, communications using VoIP will be referred to as VoIP communications.

The image forming apparatus 101 is also capable of carrying out VoIP communications with the facsimile apparatus 204 through the IP network 201, the VoIP gateway 202, and the PSTN 203.

Further, the image forming apparatus 101 is capable of carrying out G3 facsimile communications using T.38 with the facsimile apparatus 207 through the IP network 201 and the T.38 gateway 206.

Thus, the image forming apparatus 101 selects T.38 (non-VoIP) or VoIP according to a party at the other end with which the image forming apparatus 101 carries out facsimile communications, and originates a call.

Figure 2:
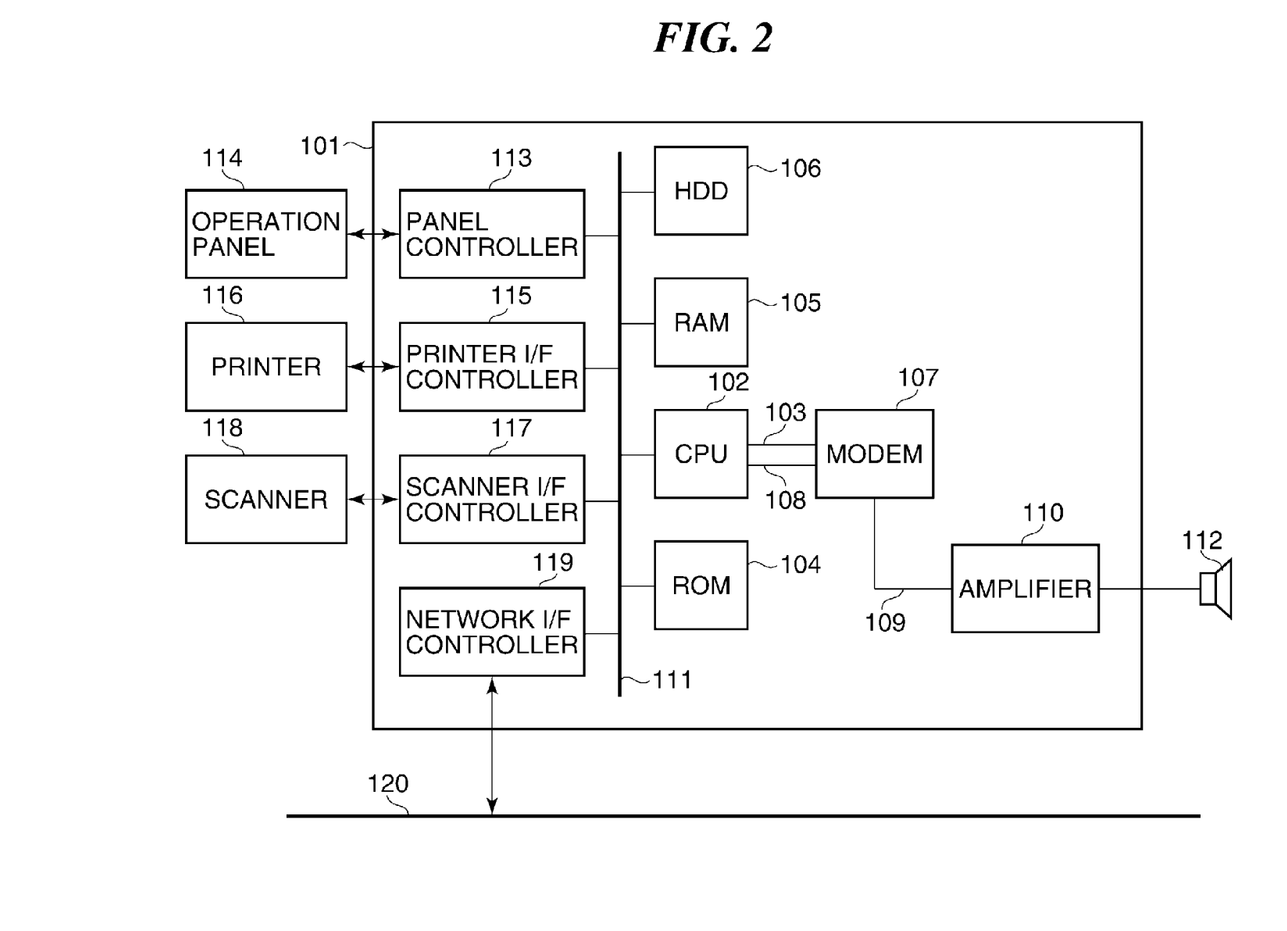
FIG. 2 is a diagram schematically showing an arrangement of the image forming apparatus appearing in FIG. 1.

FIG. 2 is a diagram schematically showing an arrangement of the image forming apparatus 101 appearing in FIG. 1.

Referring to FIG. 2, a CPU 102 executes software programs of the image forming apparatus 101 to control the entire image forming apparatus 101. The CPU 102 also controls a modem 107 connected thereto. A ROM 104 is a read-only memory, in which a boot program for the image forming apparatus 101, fixed parameters, and so on are stored.

A RAM 105, which is a random-access memory, is used to store temporary data or the like when the CPU 102 controls the image forming apparatus 101. An HDD 106, which is a hard disk drive, is used to store various data such as data to be printed and audio data for output to the modem 107. Programs for carrying out processes in FIGS. 5 to 10, to be described later, are also stored in the HDD 106.

A bus 103 is for sending and receiving digital image data to and from the CPU 102 and the modem 107. A bus 108 is for sending and receiving G.711-format data (hereafter referred to as "G.711 data") to and from the CPU 102 and the modem 107.

The modem 107 converts digital image data, which is received from the CPU 102 via the bus 103, from audio data to G.711 data and sends the G.711 data back to the CPU 102 via the bus 108. The modem 107 also converts G.711 data, which is received from the CPU 102 via the bus 108, from audio data to digital image data and sends the digital image data back to the CPU 102 via the bus 103.

Further, the model 107 is capable of executing a part of the T.30 procedures by the modem 107 alone. Also, analog data on tones handled by the model 107 is sent to an amplifier 110 via a bus 109, so that the tones are output from a speaker 112 (tone output unit).

A panel controller 113 controls an operation panel 114 to display various information and receive instructions input by a user.

A printer I/F controller 115 controls a printer 116. A scanner I/F controller 117 controls a scanner 118. A network I/F controller 119 controls transmission and reception of data to and from the LAN 120.

A bus 111 is a system bus through which control signals from the CPU 102 and data signals between the devices are sent and received. Connected to the bus 111 are the scanner I/F controller 117, the CPU 102, the ROM 104, the RAM 105, the HDD 106, the printer I/F controller 115, the panel controller 113, and the network I/F controller 119.

Thus, the image forming apparatus 101 is capable of carrying out communications according to the T.30 and T.38 procedures and has the tone output unit that outputs tones for notifying the user of communication statuses of a facsimile communication, when the facsimile communication is being carried out according to T.30.

Figure 3:
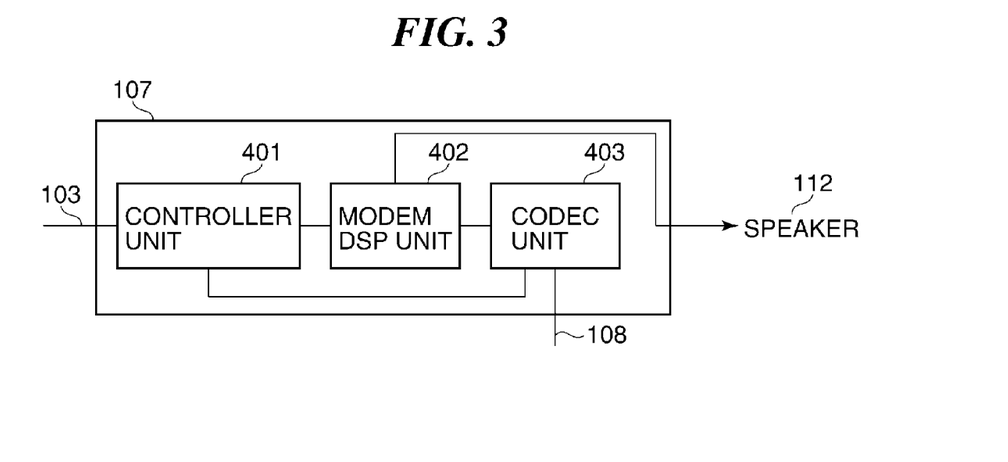
FIG. 3 is a diagram schematically showing an arrangement of a modem appearing in FIG. 2.

FIG. 3 is a diagram schematically showing an arrangement of the modem 107 appearing in FIG. 2.

Referring to FIG. 3, a controller unit 401 controls a modem DSP unit 402 and a codec unit 403. Also, the controller unit 401 is capable of sending and receiving digital image data to and from the CPU 102 via the bus 103. Further, the controller unit 401 is capable of instructing the modem DSP unit 402 and the codec unit 403 to output T.30 procedure signals (audio signals).

The modem DSP unit 402 carries out modulation and demodulation of facsimile signals by digital signal processing. The modem DSP unit 402 converts digital image data, which is sent from the controller unit 401, into an audio signal and outputs the audio signal to the codec unit 403. The modem DSP unit 402 also converts audio data, which is sent from the codec unit 403, into digital image data and outputs the digital image data to the controller unit 401. Further, the modem DSP unit 402 is capable of outputting an analog signal to the speaker 112, so that data handled by the modem 107 can be output as a tone by the speaker 112 and an analog circuit.

The codec unit 403, which carries out A/D and D/A conversion, converts audio data, which is sent from the modem DSP unit 402, to G.711 data handled in IP-FAX and outputs the G.711 data to the bus 108. The codec unit 403 also converts G.711 data, which is sent from the bus 108, to audio data and outputs the audio data to the modem DSP unit 402.

Figure 4:
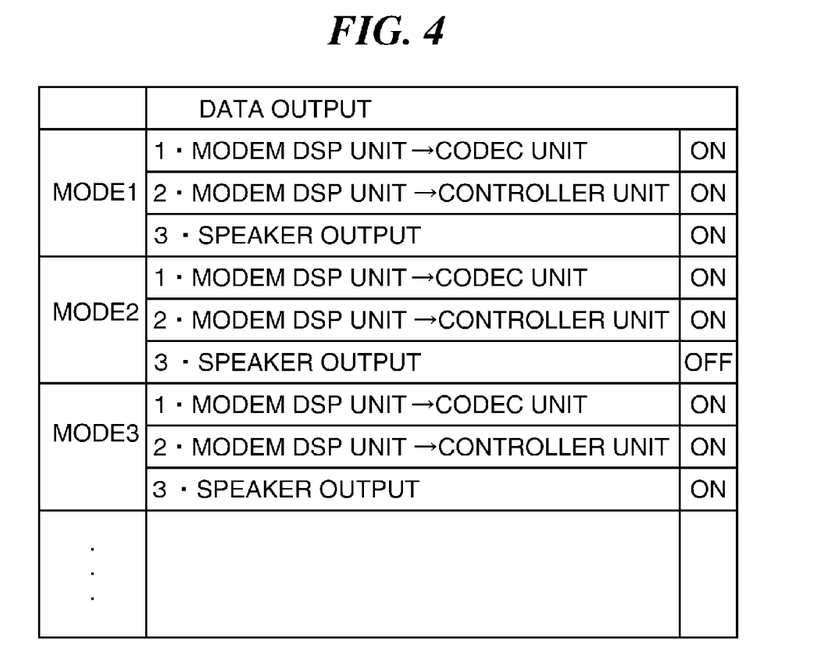
FIG. 4 is a diagram useful in explaining operation modes of the modem appearing in FIG. 2.

FIG. 4 is a diagram useful in explaining operation modes of the modem 107 appearing in FIG. 2.

Referring to FIG. 4, a mode 1 is an operation mode in which a VoIP communication is carried out, and tones are sounded via the speaker. A mode 2 is an operation mode in which a VoIP communication is carried out, and no tones are sounded via the speaker. A mode 3 is an operation mode in which no VoIP communication is carried out, and digital image data received from the bus 103 or G.711 data received from the bus 108 is sounded as tones via the speaker.

These operation modes are configured by turning on and off outputs as shown in the figure. The first output is a "data output from the modem DSP unit 402 to the codec unit 403". The second output is a "data output from the modem DSP unit 402 to the controller unit 401". The third output is a "data output from the modem DSP unit 402 to the speaker".

It should be noted that items other than the operation modes described above may be configured, and a plurality of operation modes may be prepared. Moreover, the operation modes may be configured by combinations with peripheral circuits such as the CPU 102 other than the modem 107.

Figure 5:
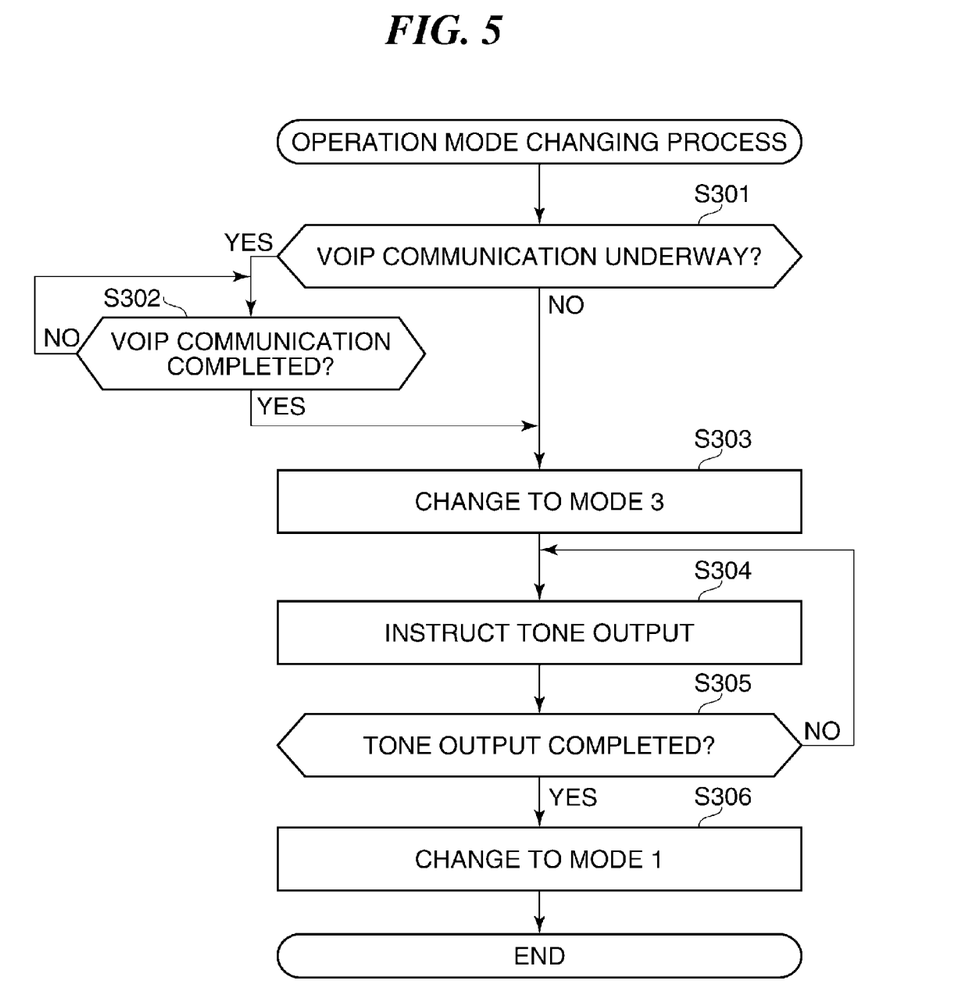
FIG. 5 is a flowchart showing the procedure of an operation mode changing process carried out by a CPU appearing in FIG. 2.

FIG. 5 is a flowchart showing the procedure of an operation mode changing process carried out by the CPU 102 appearing in FIG. 2.

The process in FIG. 5 is a process in which the operation mode of the modem 107 which is usually placed in the mode 1 is switched to the mode 3 when the image forming apparatus 101 attempts to output a tone to the user with arbitrary timing.

Referring to FIG. 5, the CPU 102 determines first whether or not a VoIP communication is underway (step S301). When, as a result of the determination in the step S301, a VoIP communication is underway (YES in the step S301), the CPU 102 proceeds to step 303 when the VoIP communication has been completed (YES in step S302).

On the other hand, when no VoIP communication is underway (NO in the step S301), the CPU 102 switches the operation mode to the mode 3 (step S303). Then, the CPU 102 instructs the modem 107 to output a tone (step S304)

Examples of this instruction to output a tone include an instruction to output a DTMF signal for dialing to the PSTN, which is a procedure signal, and an instruction to output a tone represented by audio data stored in the HDD 106 and sent to the modem 107.

Then, the CPU 102 determines whether or not tone output has been completed (step S305). When, as a result of the determination in the step S305, tone output has not been completed (NO in the step S305), the CPU 102 proceeds to the step 304. When tone output has been completed (YES in the step S305), the CPU 102 puts the modem 107 back into the mode 1 in which communications are carried out according to T.30 (step S306) and terminates the present process.

Figure 6:
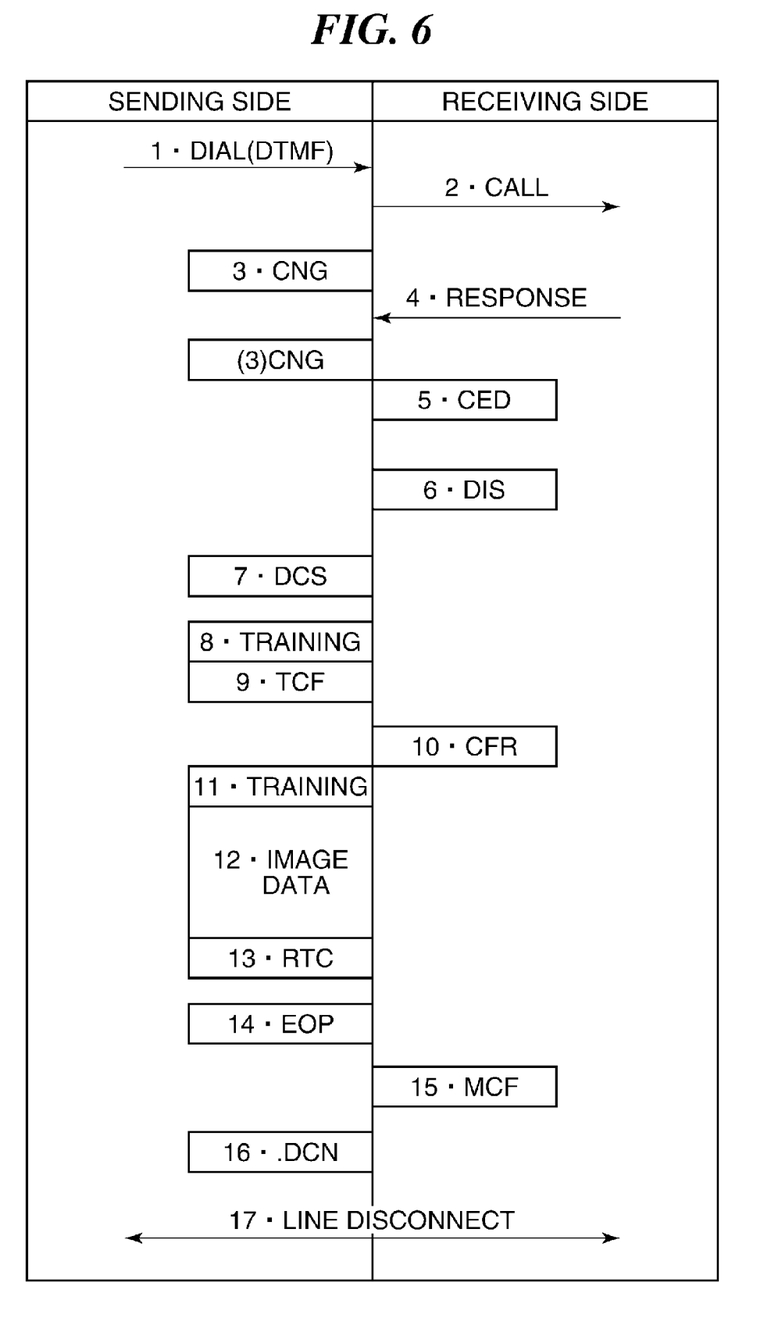
FIG. 6 is a diagram useful in explaining a general communication procedure according to T.30 using a public telephone line.

FIG. 6 is a diagram useful in explaining a general communication procedure according to T.30 using a public telephone line.

What is shown in FIG. 6 is as follows:
1•Dial from a sending side
2•Call from a switchboard
3•CNG: indicative of an autodial fax
4•Off hook by a receiving side as a response
5•CED: indicative of an auto-receipt fax
6•DIS: notifying the sending side of functions of an own apparatus
7•DCS: designating a mode for the receiving side and causing the receiving side to receive the fax
8, 11•Training: sent so as to adjust receiving conditions of a modem on the receiving side
9•TCF: sent using a modem designated by DCS
10•CFR: notifying that TCF has successfully been received and receipt has been completed
12•Image data: signal obtained by encoding an image
13•RTC: sent at an end of the first page of the image
14•EOP: notifying the receiving side that sending has been completed
15•MCF: providing notification that the image has successfully been received
16•DCN: instructing the receiving side to disconnect the line
17•Both the sending side and the receiving side disconnect the line According to the T.30 communication procedure described above, when the image forming apparatus 101 is the sending side, the CPU 102 of the image forming apparatus 101 instructs the modem 107 to send "3•CNG" and then instruct the modem 107 to wait for receipt of "5•CED" from the receiving side.

Moreover, according to the T.30 communication procedure, the modem 107 sends "3•CNG" and then waits for receipt of "5•CED". In addition, times at which control signals such as CNG are sent are prescribed.

However, when the operation mode of the modem 107 is not the mode 1 but the mode 3, all the tones should not be output in accordance with the communication procedure. Thus, processes by the CPU 102 and processes by the modem 107 are changed to processes in which they operate in the mode 3 so that tones can be output without following the communication procedure.

For example, both sending and receiving tones used in a T.30 communication may be output. Also, tones represented by audio data stored in the HDD 106 may be output. As for changing of the modes, the modes may be changed by the operation mode changing process in FIG. 5.

Figure 7:
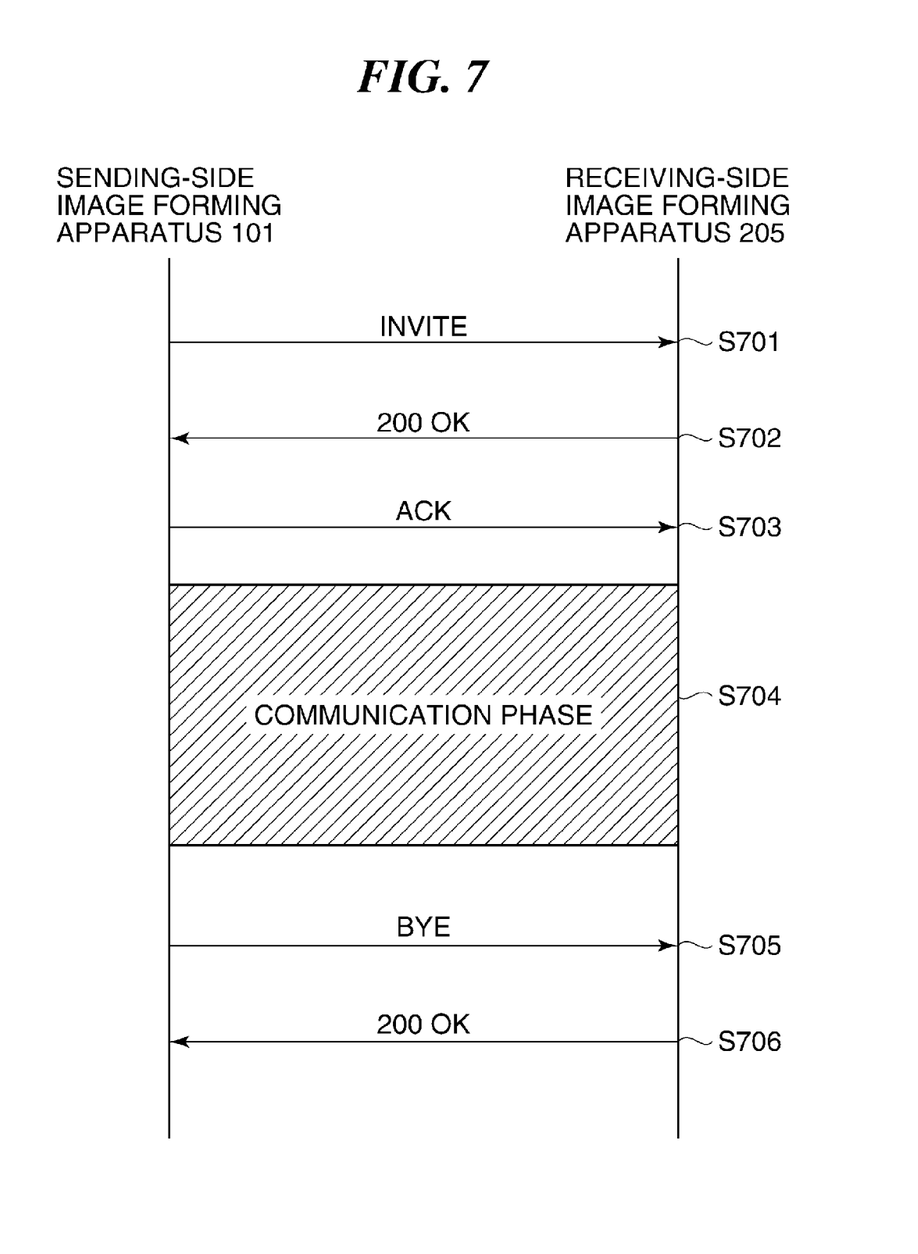
FIG. 7 is a diagram useful in explaining a general communication procedure according to T.38.

FIG. 7 is a diagram useful in explaining a general communication procedure according to T.38.

Referring to FIG. 7 which is a sequence diagram, the image forming apparatus 101 sends a facsimile to the image forming apparatus 205.

The image forming apparatus 101 sends an INVITE message to the image forming apparatus 205 (step S701). Upon receiving the INVITE message to the image forming apparatus 205, the image forming apparatus 205 closely checks an offer DSP included in the INVITE message, and when media information which it can handle is described, sends a 200 OK message (step S702). This 200 OK includes an SDP that describes media information to be accepted by the image forming apparatus 205 and a receiving port number.

Upon receiving the 200 OK, the image forming apparatus 101 sends the image forming apparatus 205 an ACK message saying that it has received the 200 OK message (step S703). As a result, a SIP session that realizes a data communication based on the media information agreed by both the image forming apparatus 101 and the image forming apparatus 205 is established between them.

After the session is established, image data is sent and received to and from the image forming apparatus 101 and the image forming apparatus 205 (step S704). When sending of the image data from the image forming apparatus 101 is completed, the image forming apparatus 101 sends a BYE message indicative of session completion to the image forming apparatus 205 (step S705).

When no communication is required after the image forming apparatus 205 receives the BYE message, and receipt of the image data is completed, the image forming apparatus 205 sends a 200 OK (step S706), and both the image forming apparatuses 101 and 205 clear a call.

Figure 8:
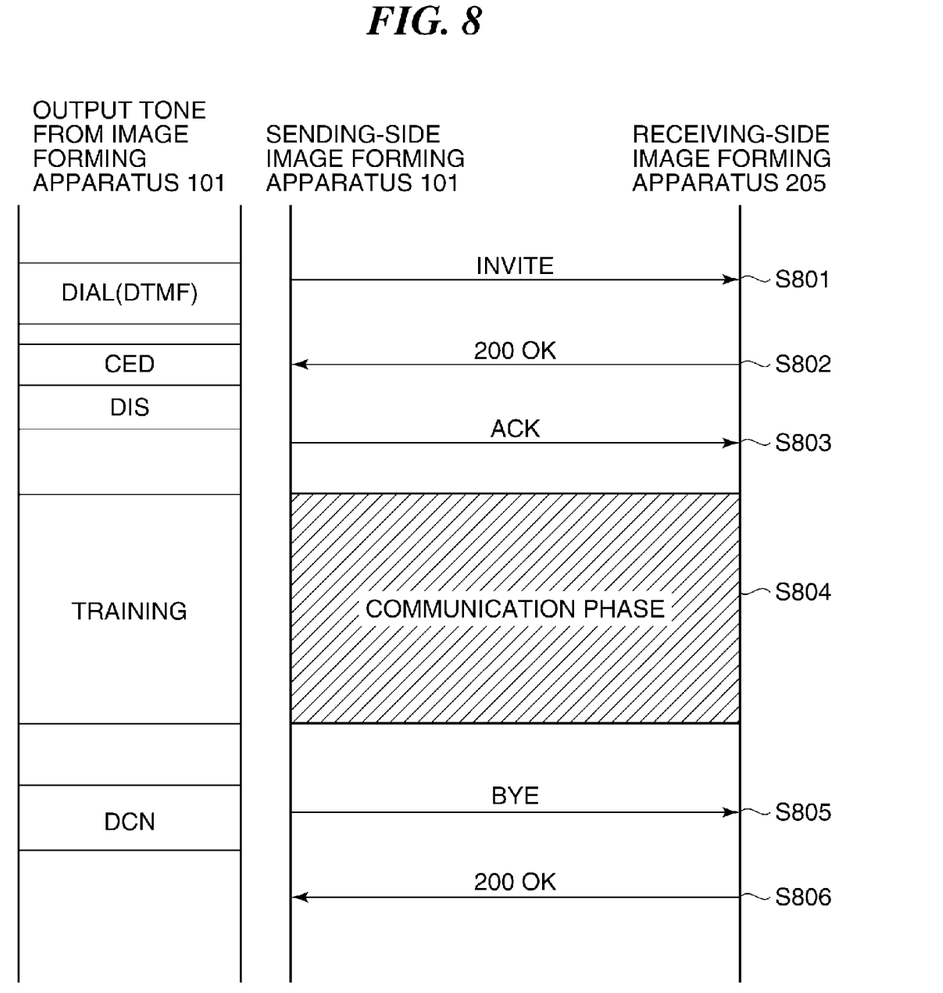
FIG. 8 is a sequence diagram showing the procedure of a tone output process in which tone are output according to the T.38 communication procedure and which is carried out by the CPU appearing in FIG. 2.

FIG. 8 is a sequence diagram showing the procedure of a tone output process in which tones are output according to the T.38 communication procedure and which is carried out by the CPU 102 appearing in FIG. 2.

Referring to FIG. 8, at the time of sending an INVITE message (step S801), the CPU 102 instructs the modem 107 to output a DTMF tone (touch tone). Then, at the time of receiving a 200 OK (step S802), the CPU 102 instructs the modem 107 to output CED and DIS tones.

In a communication phase (step S804), the CPU 102 instructs the modem 107 to output a tone for training (image sending tone according to T.30).

At the time of sending a BYE, the CPU 102 instructs the modem 107 to output a DCN tone. Upon receipt of a 200 OK (step S806), the present process is terminated.

Thus, according to the T.38 communication procedure, corresponding tones in the T.30 communication procedure are output so as to notify the user that a communication is underway. The steps S801 to S806 described above correspond to a communication unit that carries out a communication according to the T.38 communication procedure. As shown in the figure, while a communication is being carried out according to the T.38 communication procedure, the CPU 102 controls the tone output unit to output tones according to the communication procedure, and hence the CPU 102 corresponds to a control unit.

According to the tone output process in FIG. 8, control is provided such that while a communication is being carried out according to the T.38 communication procedure, tones are output according to the communication procedure, and therefore, the user can be aware that the communication according to the T.38 procedure is underway.

Figure 9:
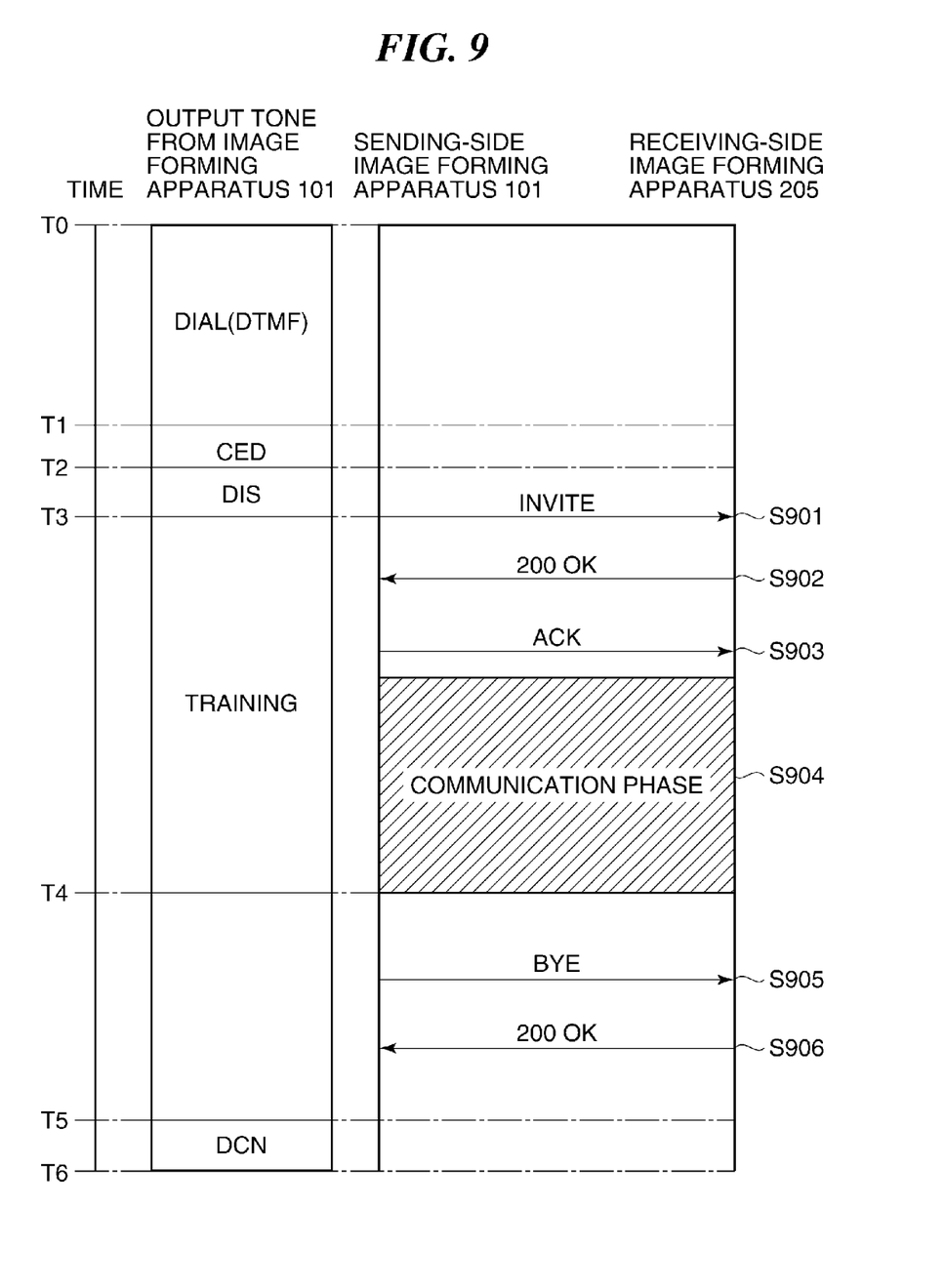
FIG. 9 is a sequence diagram showing the procedure of a tone output process in which tones are output with different timings from tone output timings appearing in FIG. 8 according to the T.38 communication procedure and which is carried out by the CPU appearing in FIG. 2.

FIG. 9 is a sequence diagram showing the procedure of a tone output process in which tones are output with different timings from tone output timings appearing in FIG. 8 according to the T.38 communication procedure and which is carried out by the CPU 102 appearing in FIG. 2.

An exemplary background against which tones are output with different timing from tone output timing in FIG. 8 is as follows: the T.38 communication procedure takes a shorter time period as compared to the T.30 communication procedure, and for this reason, when tones are output for time periods defined by the T.38 communication procedure, the user may not catch tones.

To prevent this, time lags are provided between the actual T.38 procedure and tone output, and this has the effect of enabling the user to easily catch tones.

The sequence diagram of FIG. 9 is based on times.

Time: T0 to T1

Dialing (DTMF) tones are output. A communication with the image forming apparatus 205 has not been started.

Time: T1 to T2

A CED tone is output. A communication with the image forming apparatus 205 has not been started.

Time: T2 to T3

A DIS tone is output. A communication with the image forming apparatus 205 has not been started.

Time: T3

The image forming apparatus 101 sends an INVITE message to the image forming apparatus 205 (step S901), so that a communication is started.

Time: T3 to T4

A training tone is output. In the communication, the process proceeds from the step S901 to step S904.

Time: T4 to T5

No tone is output. In the communication, the process proceeds to steps S905 and S906.

Time: T5 to T6

A DCN tone is output.

Tones may be output with timings other than the timings shown in in FIG. 9 described above. Thus, in the present embodiment, the tone output unit is controlled to further output tones before a communication is carried out according to the T.38 communication procedure and after the communication is carried out according to the T.38 communication procedure.

Moreover, there are users who would like to output T.30 communication tones and T.38 communication tones as the same tones, but it is conceivable that there may be users who would like to regard a T.30 communication and a T38 communication as different communications and output different tones so as to discriminate between the communication methods by tones. Accordingly, both T.30 communication tones and T.38 communication tones may be changed to different tones so that a T.30 communication and a T.38 communication can be discriminated from each other by tones.

Examples of the different tones described above include, in the case of dialing (DTMF) from T0 to T1, a tone to which a tone of a single frequency is added and which is output before dialing is started at T0. Alternatively, different tones may be output by making a dialing tone in dialing (DTMF) from T0 to T1 higher-pitched than a tone on the other end.

As a result, the user can be aware of differences between T.30 communication tones and T.38 communication tones. Thus, in the present embodiment, when a T.38 communication is carried out, the tone output unit is controlled to output tones different from tones that are output when a communication is carried out according to the T.30 communication procedure.

Figure 10:
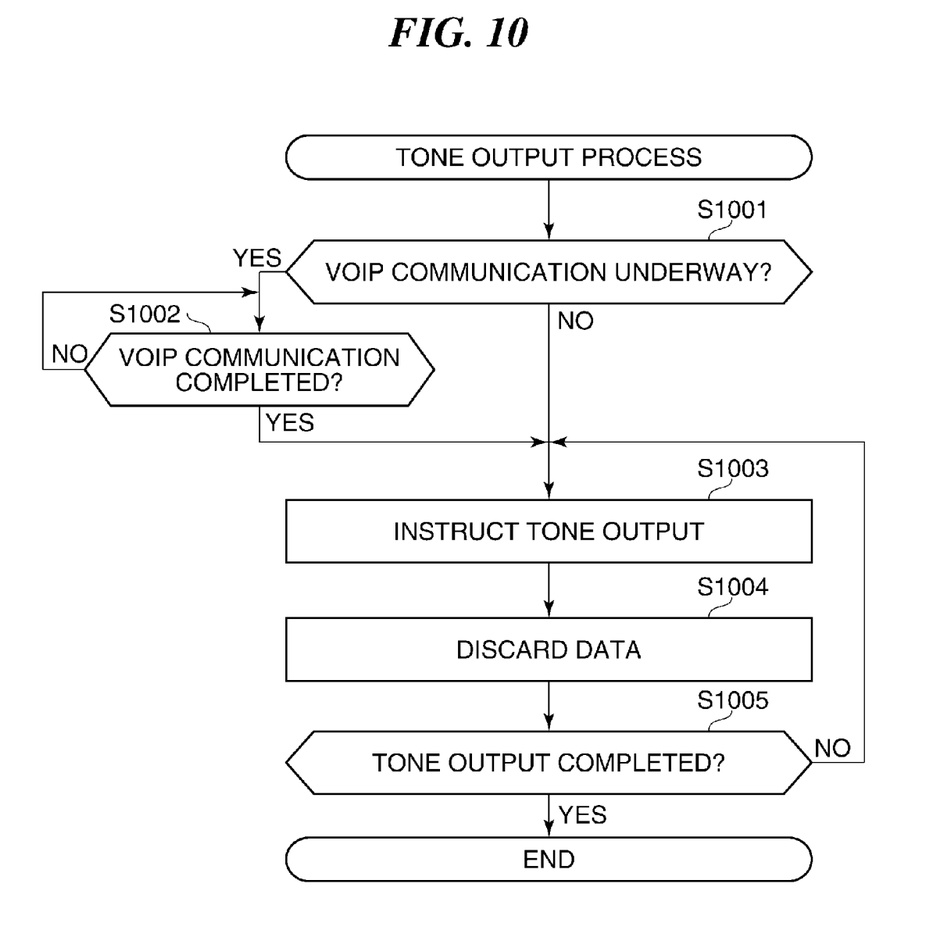
FIG. 10 is a flowchart showing the procedure of a tone output process in which tone are output without changing operation modes and which is carried out by the CPU appearing in FIG. 2.

FIG. 10 is a flowchart showing the procedure of a tone output process in which tones are output without changing operation modes and which is carried out by the CPU 102 appearing in FIG. 2.

Referring to FIG. 10, the CPU 102 determines first whether or not a VoIP communication is underway (step S1001). When, as a result of the determination in the step S1001, a VoIP communication is underway (YES in the step S1001), the CPU 102 proceeds to step S1003 when the VoIP communication is completed (YES in step S1002).

On the other hand, when the VoIP communication is not underway (NO in the step S1001), the CPU 102 instructs the modem 107 to output a tone (step S1003).

Examples of this instruction to output a tone include an instruction to output a T.30 procedure signal and an instruction to output a tone represented by audio data stored in the HDD 106 and sent to the modem 107.

Then, the CPU 102 discards data (step S1004). The data means data sent back from the modem 107 to the CPU 102. Specifically, when the instruction to output a tone, which is given to the modem 107 by the CPU 102, is an instruction to output digital image data, G.711 data is discharged. When the data is an instruction to output G.711 data, digital image data is sent back from the modem 107 to the CPU 102. The data sent back from the modem 107 is data that is output from the CPU 102 so as to output a tone but is not required for a communication, the CPU 102 discards the data.

Then, the CPU 102 determines whether or not tone output has been completed (step S1005). When, as a result of the determination in the step S1005, tone output has not been completed (NO in the step S1005), the CPU 102 proceeds to the step S1003. When tone output has been completed (YES in the step S1005), the CPU 102 terminates the present process.

The tone output process described above enables the CPU 102 to output tones without changing modes of the modem 107.

Although the tone output method using the modem 107 has been described, the above described method may be applied to not only the modem 107 but also all types of similar hardware in image forming apparatuses supporting T.38 and T.30 communications.

For example, the modem 107 is comprised of the controller unit 401, the modem DSP unit 402, and the codec unit 403. However, the controller unit 401, the modem DSP unit 402, and the codec unit 403 may be controlled independently of the modem 107 by the CPU 102, and also, if the controller unit 401, the modem DSP unit 402, and the codec unit 403 are not configured as modem chips of the modem 107, it would be no problem.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-031570 filed Feb. 16, 2012, which is hereby incorporated by reference herein in its entirety.

What is claimed is:

1. A facsimile apparatus, comprising:
   a first communication unit configured to carry out a VoIP communication in which audio data for a facsimile communication is sent and received over an IP network;
   a second communication unit configured to carry out a non-VoIP communication in which a facsimile communication is carried out via the IP network without using the audio data;
   a tone output unit configured to, when the VoIP communication is being carried out by said first communication unit, output a first tone for notifying a user of a communication status of the VoIP communication; and
   a control unit configured to, when the non-VoIP communication is carried out by said second communication unit, control said tone output unit to output a second tone so as to notify the user of a communication status of the non-VoIP communication.

2. A facsimile apparatus according to claim 1, wherein said control unit controls said tone output unit to output a third tone before the non-VoIP communication is carried out and after the non-VoIP communication is carried out.

3. A facsimile apparatus according to claim 1, wherein, when carrying out the non-VoIP communication, said control unit controls said tone output unit to output the second tone different from the first tone that is output when the VoIP communication is being carried out.

4. A facsimile apparatus according to claim 1, wherein the VoIP communication is a facsimile communication that sends and receives audio data complying with ITU-T Recommendation T.30 over the IP network, and the non-VoIP communication is a facsimile communication complying with ITU-T Recommendation T.38.

5. A facsimile apparatus according to claim 1, wherein said tone output unit is a modem.

6. A facsimile apparatus according to claim 5, further comprising a changing unit configured to place the modem in different modes between a case where the VoIP communication is carried out and a case where the non-VoIP communication is carried out.

7. A control method for controlling a facsimile apparatus, comprising:
   carrying out a VoIP communication in which audio data for a facsimile communication is sent and received over an IP network;
   carrying out a non-VoIP communication in which a facsimile communication is carried out via the IP network without using the audio data;
   causing, when the VoIP communication is being carried out, a tone output unit to output a first tone for notifying a user of a communication status of the VoIP communication; and
   controlling, when the non-VoIP communication is carried out, the tone output unit to output a second tone so as to notify the user of a communication status of the non-VoIP communication.

8. A non-transitory computer-readable storage medium storing a program for causing a computer to implement a control method for controlling a facsimile apparatus, the control method comprising:

carrying out a VoIP communication in which audio data for a facsimile communication is sent and received over an IP network;

carrying out a non-VoIP communication in which a facsimile communication is carried out via the IP network without using the audio data;

causing, when the VoIP communication is being carried out, a tone output unit to output a first tone for notifying a user of a communication status of the VoIP communication; and     controlling, when the non-VoIP communication is carried out, the tone output unit to output a second tone so as to notify the user of a communication status of the non-VoIP communication.

9. A facsimile apparatus according to claim 4, wherein said tone output unit outputs the first tone in the VoIP communication complying with the ITU-T Recommendation T.30 and outputs the second tone in the non-VoIP communication complying with ITU-T Recommendation T.38.

\* \* \* \* \*